Feb. 19, 1952 T. W. RATCLIFFE ET AL 2,586,713
APPARATUS FOR CONTROLLING THE RATE OF POURING FLUID
MATERIAL FROM ONE CONTAINER INTO ANOTHER
Filed July 29, 1949 6 Sheets-Sheet 1

INVENTORS
TEMPLE W. RATCLIFFE
& SIDLEY O. EVANS
BY
ATTORNEY

INVENTORS
TEMPLE W. RATCLIFFE &
SIDLEY O. EVANS
BY
ATTORNEY

Feb. 19, 1952   T. W. RATCLIFFE ET AL   2,586,713
APPARATUS FOR CONTROLLING THE RATE OF POURING FLUID
MATERIAL FROM ONE CONTAINER INTO ANOTHER
Filed July 29, 1949   6 Sheets-Sheet 3

INVENTORS
TEMPLE W. RATCLIFFE
BY & SIDLEY O. EVANS
JPMoran
ATTORNEY

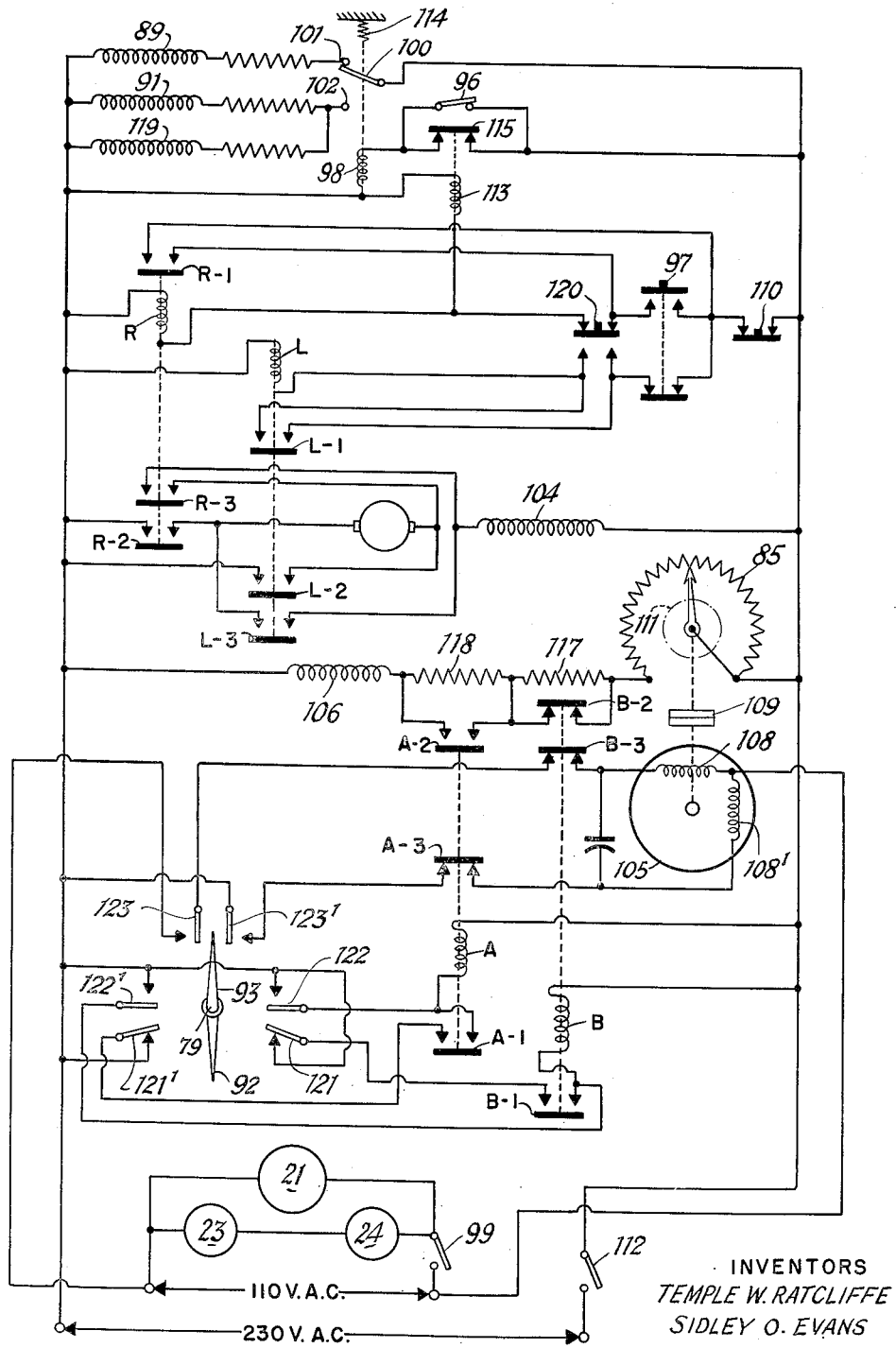
FIG. 7
INVENTORS
TEMPLE W. RATCLIFFE
SIDLEY O. EVANS
BY 
ATTORNEY

INVENTORS
TEMPLE W. RATCLIFFE
BY & SIDLEY O. EVANS
ATTORNEY

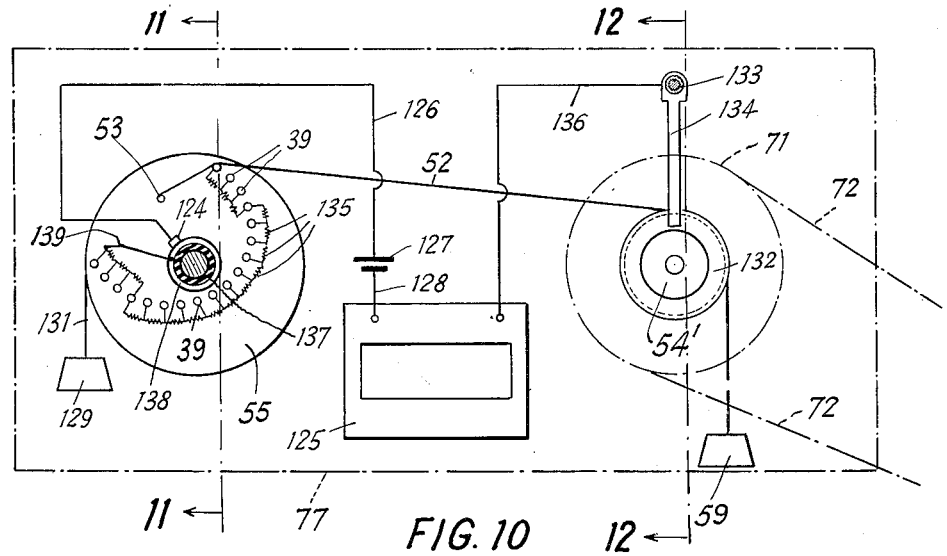
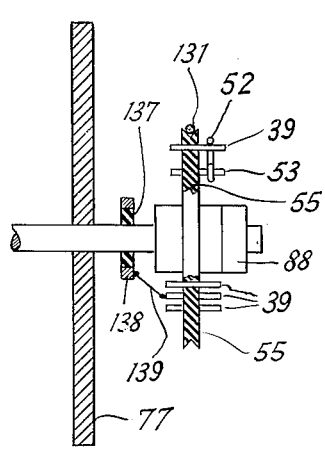
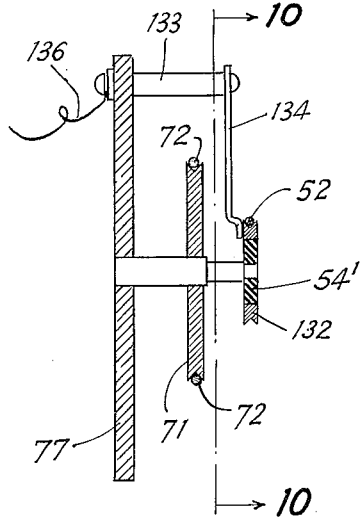
FIG. 11  FIG. 12

Patented Feb. 19, 1952

2,586,713

UNITED STATES PATENT OFFICE 2,586,713

APPARATUS FOR CONTROLLING THE RATE OF POURING FLUID MATERIAL FROM ONE CONTAINER INTO ANOTHER

Temple W. Ratcliffe and Sidley O. Evans, Beaver Falls, Pa., assignors, by mesne assignments, to The Babcock & Wilcox Company, Jersey City, N. J., a corporation of New Jersey Application July 29, 1949, Serial No. 107,506

6 Claims. (Cl. 22—57.2)

This invention relates to an apparatus for controlling the rate of pouring fluid material from one container into another container either directly or through the medium of an intermediate or transfer container. In particular, the apparatus of the invention involves a master control of the rate of tilting an initial container to achieve an optimum rate of pour therefrom into the final or receiving container.

The maintenance of an optimum rate of pouring fluid material from one container, such as a charging ladle or the like, into another container, such as a chemical reaction chamber or tower, processing apparatus such as a mixer, grinder or pulverizer, or a metal solidifying mold, is of great importance in many chemical, metallurgical, and other operations. In many of these operations, a previously processed or semi-processed batch of fluid material is poured from a tiltable container, such as a ladle, into further processing apparatus including another container. The control of the pour rate can be effected by controlling the tilting rate of the initial container.

Such control of the pour rate by control of the tilting rate can be achieved only by taking into consideration the geometry of the tilting container and the geometry of the tilting mechanism. For example, in pouring from a cylindrical container having substantially the shape of a drinking glass with a flat bottom, the shape of the surface of the fluid remaining in the container is initially an oval, then a truncated oval, and finally a very shallow rectangle. Consequently, the pour rate does not vary in direct accord with the tilt rate, but is a variable function of the latter. The same is true of pouring from hemispherical or other shape containers.

Some operations require that the pour rate be maintained uniform throughout the pour, others require a variable rate, and still others require a combination of a uniform rate and a variable rate. In the pouring of a new charge of material into a chemical reaction chamber, where the reaction takes place at a uniform set rate, it is desirable to maintain the pour rate at a corresponding uniform rate. On the other hand, in pouring molten metal into a centrifugal casting mold, it is necessary to pour initially at a very high rate to quickly form a relatively thin solidified embryonic casting skin on the chilled walls of the mold. Immediately after such initial pour, the pour rate is very substantially reduced in order that the mass of molten metal in the mold will not be so great that the centrifugal force of the molten metal will cause the same to break through the embryonic casting skin which has shrunk away from the mold wall and is consequently unsupported.

The desired pour rates may also be a function of the geometry of the receiving container. For example, if the latter is an inverted truncated cone and it is desired that the height of material therein increase at a uniform rate, then the rate of pour must likewise be increased at a uniform rate to compensate for the increasing volume of material per unit height as the receiving container is filled.

The apparatus of the present invention provides for the maintenance of any desired pour rate, whether the desired pour rate is uniform, uniformly variable, combined uniform and non-uniform, or non-uniformly variable.

The apparatus of the invention includes a first shaft, movable in accordance with movement of the container tilting mechanism, and a second shaft movable in accordance with the desired rate of tilting. These shafts are preferably concentric and telescoped, although not necessarily so related, and each shaft carries an indicator. In a semi-automatic embodiment of the apparatus, the operator continually observes the two indicators and controls the rate of operation of the tilting mechanism to maintain the indicators in correspondence. For fully automatic control, any difference between the motion of the two shafts is measured as to direction and degree, and such measurement is utilized to control the rate of operation of the tilting mechanism in a corrective direction. The difference may be measured by a mechanical or electric differential motion device which correctively varies the speed of the tilting mechanism.

The shaft movable in correspondence with the desired tilting rate is operated by mechanism which translates a preset optimum desired pour rate into the tilting rate corresponding to such pour rate. This mechanism includes a cam driven at an adjustable constant angular velocity and having an adjustable cam contour which is set in accordance with the ratio of the pour rate to the tilting rate necessary to achieve the pour rate. A suitable cam follower is engaged with the cam contour and is connected to operate a drive for the desired tilt rate indicator shaft. Consequently, the uniform rotation of the cam is translated into a movement of such indicator which may be constant or variable in speed dependent upon the pour rate desired, the geometry of the initial container and the geometry of the tilting mechanism.

More specifically, the pour rate-tilt rate translating means comprises a pin cam driven by a synchronous motor through an adjustable speed change arrangement. The pin cam has a large number of closely spaced apertures so that, by placing pins in a group of selected apertures, any desired cam contour may be attained. A cable or chain has one end anchored to the cam, and the other end trained over the pins and the input sprocket or pulley of a rate changing power transmission device.

When the cam is rotated at a constant speed in a winding direction, the cable or chain is wrapped around the pins set to form a predetermined cam contour. The variations in the cam surface formed by the pins cause the chain or cable to drive the input sprocket or pulley at a correspondingly varying angular velocity. The output member of the transmission device is drivingly connected to the shaft carrying the indicator of desired tilt rate. The pouring speed is selected by adjusting the speed changer interconnecting the synchronous motor and the cam.

By changing the location of the pins on the cam, the cam contour may be set for any tilting rate necessary to effect a desired pour rate. Thus, the cam may be easily adapted to attain the rapid initial pour rate and constant subsequent pour rate of molten metal desirable for centrifugal casting. Alternatively, the pins may be set to effect a desired tilt rate corresponding to a constant pour rate, such as is considered requisite for the continuous metal casting method shown and described in the copending application of I. Harter et al., Serial No. 10,956, filed February 26, 1948.

In such continuous metal casting method, molten metal is introduced at the upper end of an upright, chilled mold and semi-finished products, ready for shaping and finishing, are delivered from the lower end. The molten metal is transported to the casting apparatus in a suitable transfer ladle and discharged therefrom into a tiltable container, such as a holding and pouring ladle.

For reasons set forth in said copending application, the molten metal is not poured from the tiltable ladle directly into the mold, but instead is poured into an intermediate container, called a tun dish, which is angularly positioned to direct molten metal centrally into the mold. By control of the ladle tilting rate, the molten metal is poured at a continuous, selected and constant rate into the tun dish, and is correspondingly poured from the tun dish into the mold at the same constant pour rate. Means are provided for withdrawing the solidified casting from the mold at a constant rate so coordinated with the pour rate that the level of metal within the mold is maintained at a predetermined level. Thereby, the time of contact of the metal with the chilled mold is regulated at an optimum value.

To use the invention apparatus with the Harter et al. continuous metal casting method to maintain a constant molten metal pour rate into the mold, a continuous indication of the rate of operation of the ladle tilting mechanism is provided. This indication is constantly compared with a continuous indication of the desired rate of tilt. The latter is derived from the pin cam by setting the pins therein in such position that a continuous indication of the rate of tilt corresponding to a constant pour rate is provided. When there is any discrepancy or differential between the two indications, the speed of the ladle tilting mechanism is either manually or automatically varied in a corrective direction to bring the indications back into correspondence. Thus, the pour rate is maintained at a constant value and, provided the casting withdrawal rate is maintained at a corresponding substantially constant value, the molten metal level in the mold is maintained at a substantially constant value.

Such maintenance of the molten metal level at a constant value is not always possible by maintaining the pour rate constant by using the master tilting control, and by maintaining the casting withdrawal rate at a correlated constant value. This is due to erosion of the refractory lining of the pouring ladle, particularly due to the attack on most refractory linings by the non-metallics and iron compounds in the molten metal. The development of such slags is a prerequisite in the manufacture of steel, for purification of the steel, and the erosive conditions are much more severe than in the melting of non-ferrous metals, such as copper and aluminum. In the latter case, the erosive characteristics of the slag and the comparatively low temperatures involved have little or no disintegrating effect on the refractory linings of furnaces or other containers in which the non-ferrous metals are melted or handled.

During the use of a particular lining in the pouring ladle, there is the aforementioned erosion in certain parts and also a build up of the lining in other parts. Consequently, the geometry of the container varies from pour to pour and, even during a pour, slag or the like may partially obstruct the ladle pouring lip. With a given lining and a given metal analysis, it is possible to set the control cam contour to maintain a constant pour rate for the average geometry of the ladle during the life of the lining, or even to set the contour for each successive pour. However, due to the possible obstructions of the ladle pouring lip during a pour, the metal level can not be maintained accurately constant by controlling the tilting rate and maintaining the withdrawal rate constant. Hence, the invention contemplates, in this and similar cases where accurate control of the material level is required, the use of a vernier control of the withdrawal rate, such vernier control involving continual measurement of the material level. When the latter varies from the predetermined value, the indication of the vernier control is utilized to vary the material withdrawal rate in a direction to restore the level to the pre-set value. The combination of the vernier control of the withdrawal rate with the master control of the tilting rate assures maintenance of the material level accurately at the pre-set value.

The material level measuring and responsive control may be any desired type, dependent upon the operation being controlled, and capable of controlling the material withdrawal rate. For example, in certain operations, a float control may be used, in others a photo-electric scanner, etc. For the continuous casting process referred to above, it is preferred to use the penetrating radiation type of automatic level indicator and control shown and described in the copending application of I. Harter, Jr., Serial No. 73,643, filed January 29, 1949. In such level indicator and control, an upwardly extended beam of penetrating radiation, such as X-rays, for example, is directed through the mold and into an ionization chamber. The strength of the radiation is so selected that the radiation beam will penetrate through the mold and into the ionization chamber when there is no molten metal or other material in the path of the beam. When molten metal or the like intercepts a portion or all of the beam, there is a corresponding change in the conductivity of the ionization chamber due to the changed amount of radiation entering such chamber. The conductivity of the ionization chamber is thus a measure of the fluid material level in the receiving container, and this measurement is utilized to control the speed of operation of the withdrawal mechanism, such as the pinch rolls in the case of continuous casting. The penetrating radiation indicator and control is of special applicability to operations involving an opaque mold or other opaque receiving container. When a level indicator and control is used with the tilting control, there is provided a combination master and vernier control of the material level in the receiving container, with the tilting control comprising the broad or master control component and the level control comprising the fine or vernier control component. This combination, however, is necessary only where very accurate level control is needed and, in most applications, the tilting control per se is effective to attain the desired objectives.

With the foregoing in mind, it is an object of the pre-set invention to provide an apparatus for controlling the rate of pouring fluid material from one container into another by control of the rate of tilting the first container.

Another object is to provide such an apparatus for affording a master control of the material level in a receiving container in combination with a method and apparatus for measuring the level of the material and affording a vernier control of the material level, the master and vernier controls conjointly acting to maintain such level at an optimum value.

A further object is to provide such control apparatus of universal application and being particularly advantageous in metal casting operations.

These and other objects, advantages and novel features of the invention will be apparent from the following description and the accompanying drawings. In the drawings:

Fig. 7 is a schematic wiring diagram of control circuits incorporated in the invention;

Fig. 10 is vertical sectional view, substantially on the line 10—10 of Fig. 12, somewhat schematically illustrating an arrangement recording when each pin of the pin cam of Fig. 4 engages a cam follower cable; and Figs. 11 and 12 are transverse sectional views on the correspondingly numbered lines of Fig. 10.

The invention is directed primarily to controlling the rate of pouring fluid material from an initial container into a receiving container by controlling the rate of tilting the initial container. If the rate of withdrawing material from the receiving container is coordinated with the optimum pouring rate, then the invention may also function to control the level of material in the receiving container. In certain of such level control applications, however, the tilting rate is not a sufficiently accurate measure of the pour rate due to erosion, corrosion, or variation in the geometry of the initial container, any or all of which may occur during a particular pour. In such applications and where a very accurate control of the material level in the receiving container is considered necessary, the tilting control may be used as a master control of the material level, and the invention contemplates the attainment of a vernier level control by continually measuring the material level and varying the material withdrawal rate to maintain such level at an optimum value.

In order to provide an example of a particular processing operation involving both the "master," or tilt rate, control and the "vernier," or level measuring control, the invention will be described as applied to control of the continuous metal casting process described in said copending application of I. Harter et al., Serial No. 10,956. However, as the tilt-rate control is applicable to many operations in which the level control is not necessary, the tilt-rate control will be fully described before reference is made to the vernier level control afforded by the level measuring feature of the control.

Figure 1:
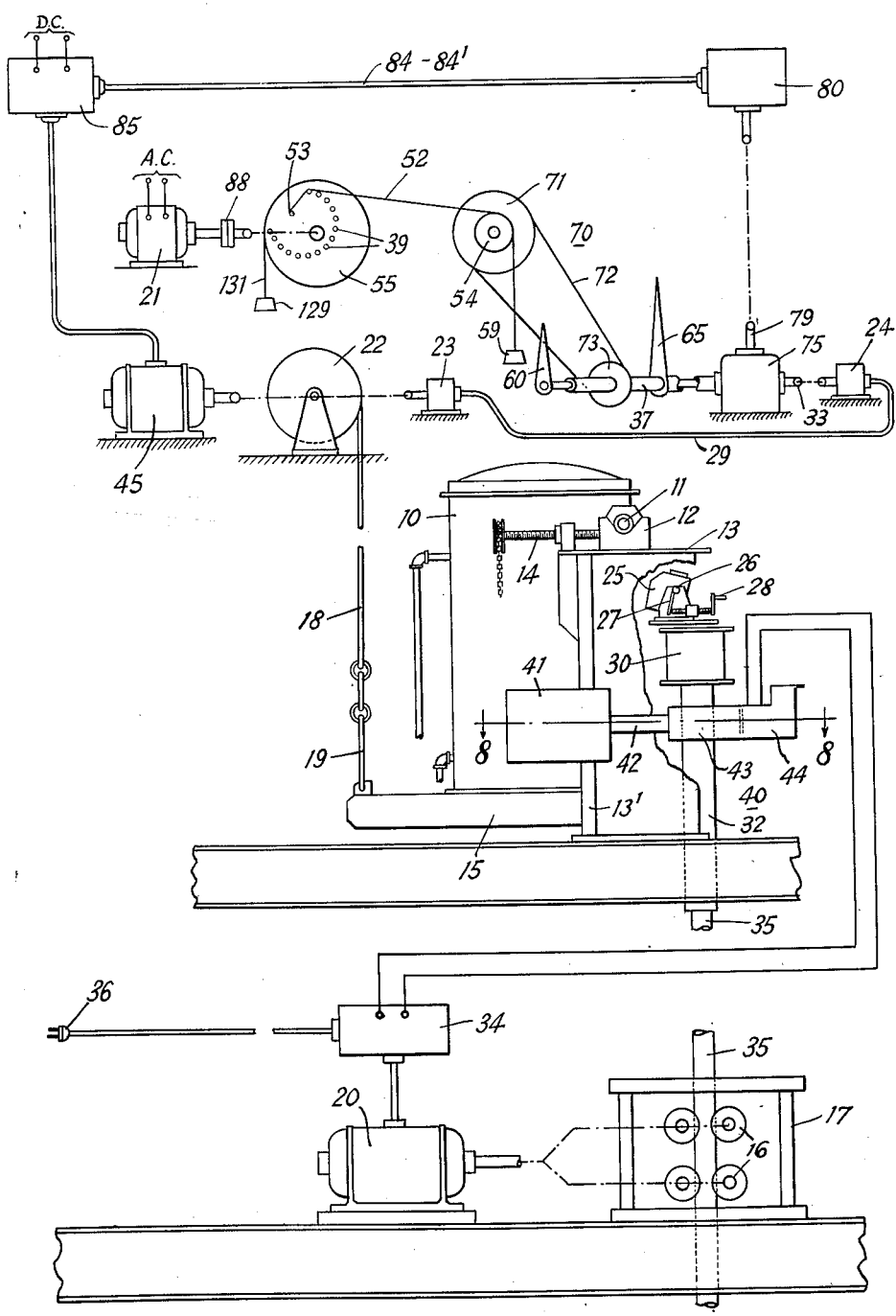
Fig. 1 is a partial side elevation of continuous metal casting apparatus embodying the combined master-vernier control of invention, including a schematic illustration of a master ladle tilting pour rate control and a casting withdrawing arrangement controlled by the vernier or level responsive control.

Referring to Fig. 1, in the continuous casting apparatus shown therein, molten metal is introduced at one end of the apparatus and semifinished products, ready for shaping and finishing, are delivered from the opposite end. The molten metal is transported to the apparatus from a melting furnace (not shown) in any suitable manner, such as by a transfer ladle. The metal is poured from the transfer means into a suitable tiltable holding and pouring ladle 10 which is constructed and operated to maintain the molten metal held therein at a selected substantially constant temperature. For this purpose, the ladle 10 may be heated by suitable means, for example by induction heating.

Ladle 10 is arranged for pouring the molten metal, at a continuous selected and controlled pour rate, into an adjustably positioned tun dish 25. In this specific example of the invention, tun dish 25 acts merely as an intermediate transfer vessel between ladle 10 and mold assembly 30. Ladle 10 is mounted on trunnions 11 engaged in trunnion bearings 12 on an L-shaped frame 15, and is provided with a suitable pouring lip above tun dish 25. The lateral position of bearings 12 is adjustable along guides 13 on pedestals 13' through operation of screws 14 which are driven by suitable means, such as geared motors (not shown).

As described in said copending application Serial No. 10,956, tilting of frame 15 and ladle 10 is effected through a cable 18 attached to a yoke 19 on the frame, the cable being passed through conventional blocks (not shown) and wrapped around a grooved drum 22 schematically illustrated as driven by a reversible variable speed motor 45. The electrical and cooling water connections to the ladle 10 are as described in either of said copending applications.

Tun dish 25 discharges the molten metal into the upper end of, and preferably along the axial center of, an associated mold assembly 30, where the metal is rapidly chilled to form the shell or skin of an embryo casting. Solidification of the casting is completed in a subsequent delayed cooling and soaking section, from which it is withdrawn as a continuous casting 35 by pinch rolls 16 mounted in a stand 17. The pinch rolls are schematically indicated as driven by a reversible variable speed motor 20, whose speed is controlled either manually in accordance with the tilting rate or by a level control in a manner described more fully hereinafter. The tun dish is mounted in open trunnion bearings 26 and, as shown in Fig. 1, has a depending arm 27 secured to one trunnion and engaged by a screw crank 28. Adjustment of the vertical angle of tun dish 25 is effected by turning crank 28.

Figure 8:
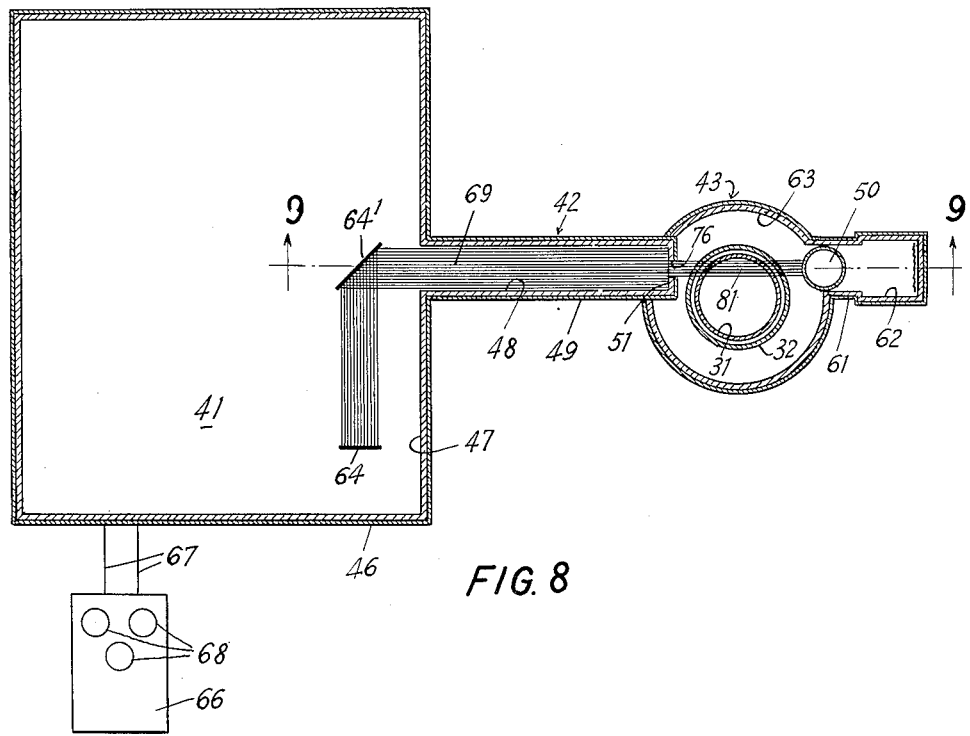
Fig. 8 is a transverse sectional view on the line 8—8 of Fig. 1.
Figure 9:
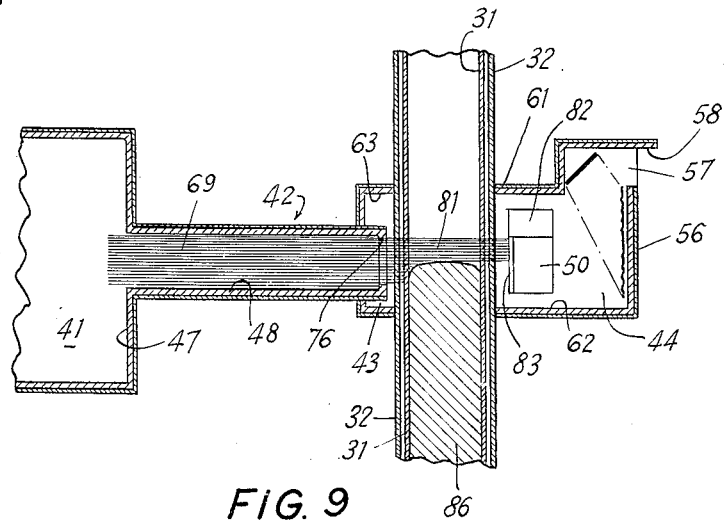
Fig. 9 is a vertical sectional view on the line 9—9 of Fig. 8.

As shown more particularly in Figs. 8 and 9, the mold assembly 30 includes a molding tube or mold liner 31 concentric with and of less diameter than an outer tube 32, and means are provided to pass cooling fluid between the two tubes to cool tube 31 to chill the molten metal. The particular arrangements are fully shown and described in said copending application Serial No. 10,956, and are not described in detail herein except insofar as necessary to a clear understanding of the present invention as applied to a continuous casting.

In the continuous casting method, the invention is applied to control the degree of tilt of the ladle 10 or other pouring means. This tilting control involves the constant measurement and indication of the actual degree of tilt, the constant providing of an indication of a degree of tilt corresponding to the optimum pouring rate, and control of the actual degree of tilt in such a manner as to maintain correspondence between the two indications. As applied to the continuous casting apparatus of Fig. 1, a constant indication of position of hoist drum 22 is provided and is compared with an indication of degree of tilt corresponding to the optimum pour rate of ladle 10. This latter indication is derived from a variable contour pin cam 55 driven at a uniform angular velocity by a synchronous motor 21. The two indications are compared and kept in correspondence by corrective adjustment of hoist or tilt drive motor 45. Such adjustment may be effected either manually or automatically.

Figure 2:
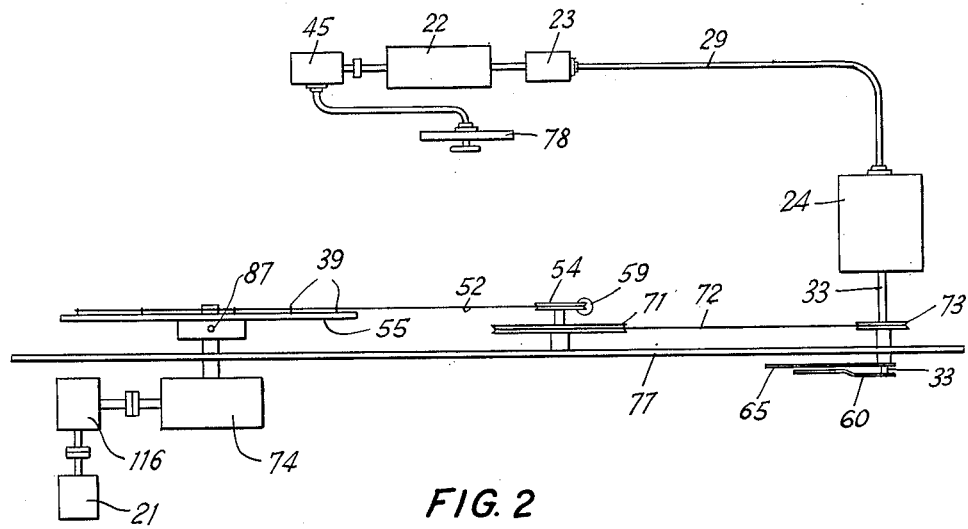
Fig. 2 is a top plan view of a semi-automatic embodiment of the tilting rate control, certain associated elements being shown schematically.
Figure 3:
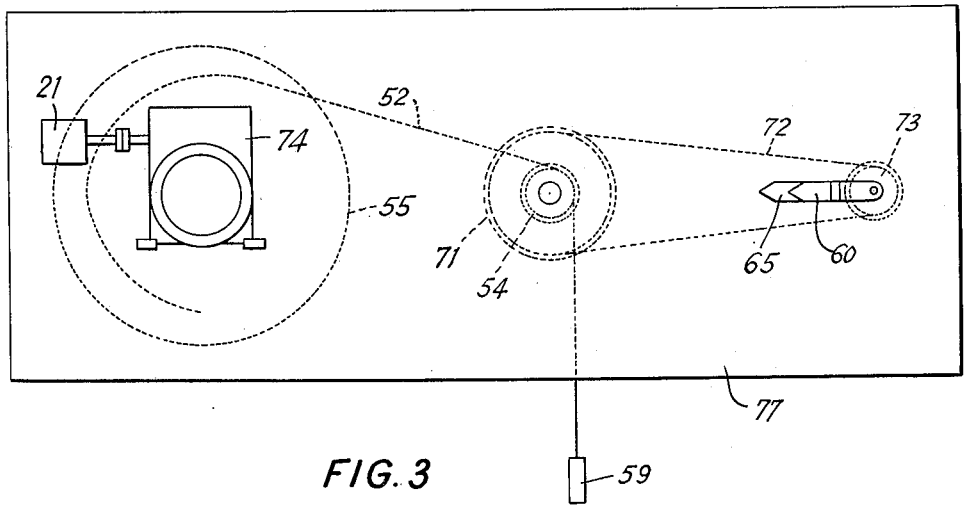
Fig. 3 is a front elevation of the tilting control of Fig. 2.

Referring to Figs. 1, 2, and 3, a self-synchronous position transmitter 23 has its rotor driven by drum 22 and is connected to a self-synchronous receiver 24 by an electric cable 29. As is known to those skilled in the art, with such a self-synchronous arrangement, the rotor of receiver 24 faithfully reproduces movement of the rotor of transmitter 23, and is connected to a shaft 33 on the end of which is an indicator 60. As drum 22 is continuously rotating during a pour, indicator 60 is continuously rotated and thus serves to indicate the actual rate of movement of drum 22. An indication of the desired degree of tilt corresponding to the optimum pour rate of ladle 10 is provided by an indicator 65 on a sleeve shaft 37 concentric with and telescoped over shaft 33.

Figure 4:
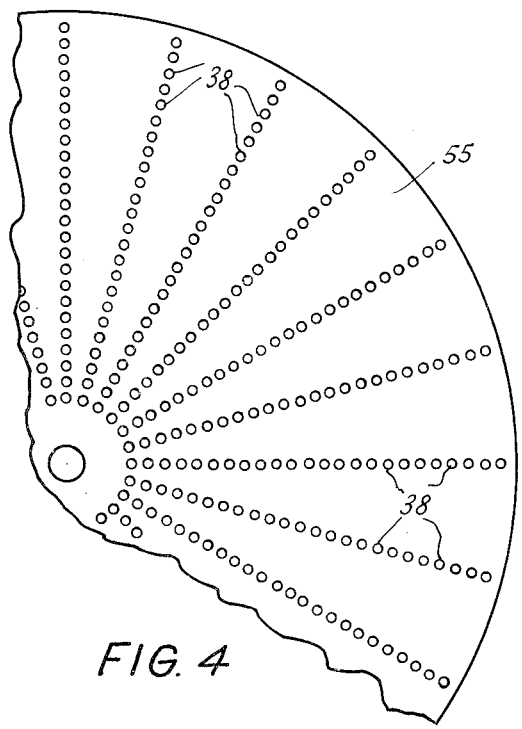
Fig. 4 is a partial elevation view of a pin cam included in the tilting rate control.

Such indication of degree of tilt is produced in the following manner. Pin cam 55, as shown in Fig. 4, is provided with a large number of pin receiving apertures 38 each adapted to receive a pin 39. A chain or cable 52 is arranged to be wrapped over a number of these pins, set to provide a predetermined cam contour, and its end is secured to a fixed or anchor pin 53. Chain 52 is trained over a sprocket 54 and a weight 59 is secured to the free end of the chain. A gear or sprocket 71 is keyed to sprocket 54 and is drivingly connected by an endless chain 72 to a sprocket 73 secured to rotate with shaft 37. As cam 55 is driven in a direction to wrap chain 52 over pins 39 by synchronous motor 21 through speed changer 116, chain 52 drives sprocket 54. Sprocket 71 correspondingly drives shaft 37 through chain 72 and sprockets 73 to rotate indicator 65.

Indicator 65 is thus rotated by cam 55, which is driven at a uniform angular velocity by synchronous motor 21. However, the angular velocity of sprocket 54, and thus of indicator 65, is determined by the arrangement of pins 39 in apertures 38 to provide the cam shaped "wrapping" surface for chain 52. The setting of pins 39 is arranged so that the rate of motion of indicator 65 corresponds to the rate of tilt of ladle 10 needed to provide the optimum pour rate into tun dish 25. Such arrangement may be determined either mathematically, as by plotting the degree of tilt of ladle 10 per unit of time for a selected pour rate, or may be determined empirically.

The ratio of the linear velocity of chain 52 relative to the angular velocity of cam 55 is determined by the relative distance of the pins 39 from the axis of the cam. For example, if two adjacent pins are in the radially outermost holes 38, the movement of chain 52 will be a maximum for a given degree of rotation of cam 55 corresponding to the angular spacing of the pins 39. On the other hand, if two adjacent pins are in the radially innermost holes 38, the corresponding movement of chain or cable 52 will be a minimum.

In a particular case, cam 55 is 14 inches in diameter and holes 38 are arranged in radial rows 15° apart. Each radial row has 24 holes starting at 1 inch from the cam axis and spaced ¼ inch apart, with the outermost holes being ¼ inch from the cam edge. With such a cam, the chordal distance between a pair of the outermost pins is approximately 1¾ inches and that between a pair of the innermost pins is a little more than ¼ inch. Consequently, there is available a 7:1 range of linear movement for cable or chain 52 for each 15° movement of cam 55.

Assume that, in a hypothetical case the optimum pour rate requires the fastest tilt for the initial portion of the pour followed by the slowest possible tilt for the remainder of the pour. In such case, the first pin angularly from anchor pin 53 would be located in the outermost circular row of holes 38, as would the several following pins controlling the total time of the initial highest tilt rate. The first pin to be engaged by the cable during the subsequent lowest tilt rate would be located in the innermost circle of holes 38, as would the remaining pins corresponding to the rest of the pour time. Consequently, with cam 55 rotated at a constant angular velocity, cable or chain 52 would be rapidly moved linearly while being wrapped around the first group of pins, and then have a rate of linear movement about ⅐ of the initial rate while being wrapped around the final group of pins. As a result, sprocket 59 and thus indicator 65 will have an initial relatively rapid rotation rate followed by a much slower rate of rotation. Cam 55 should preferably make not more than one revolution during each pour.

Once the pin setting has been properly determined, indicator 65 will be moved, by cam 55, pins 39, chain 52, etc., to correspond to the desired rate of tilt and indicator 60 will move in accordance with the actual rate of tilt. These two indicators are mounted on the face of a control panel 77, so that an operator may observe their relative angular relation. In the event the indicators move out of correspondence, the operator adjusts the speed of hoist motor 45 in a corrective direction through the medium of a motor speed control rheostat 78. For example, should needle 60 lead needle 65, rheostat 78 is adjusted to decrease the speed of motor 45 to slow the tilting rate until indicators 60, 65 are returned to angular correspondence or coincidence. In practice, a considerable adjustment of rheostat 78 may sometimes be needed to maintain the indicators coincident.

Figure 5:
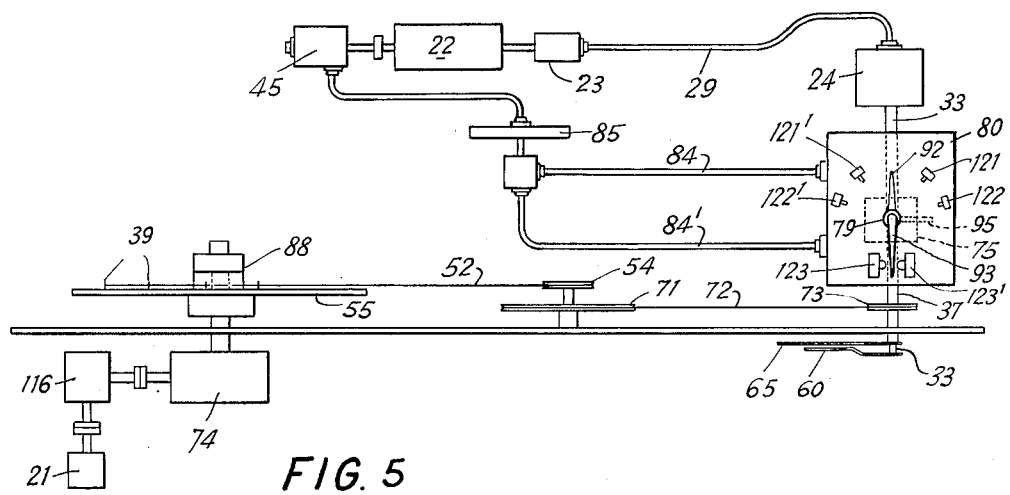
Fig. 5 is a top plan view of a fully automatic embodiment of the tilting control, certain associated elements being shown schematically.
Figure 6:
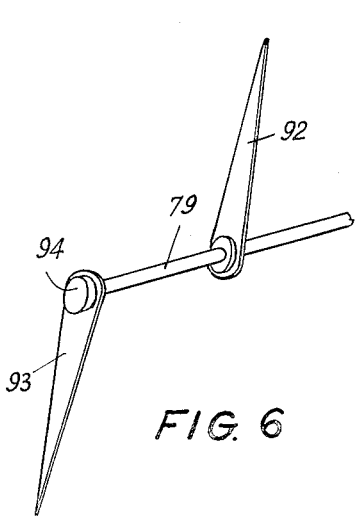
Fig. 6 is an exploded perspective view of a pair of switch actuators included in the tilting control of Fig. 5.

Such coincidence may be maintained automatically by addition of the other elements shown in Fig. 1, and with the control panel arrangement of Figs. 5 and 6 and the wiring diagram of Fig. 7. Referring to Figs. 1 and 5, a differential gear drive (for example, of the type shown in Carpenter et al. Patent No. 2,458,503) 75 is provided having its input driving gears connected respectively to shafts 33 and 37 and so arranged that any differential rotation of these shafts effects rotation, in one direction or the other, of the differential output shaft 79. Rotation of shaft 79 effects operation of a speed and direction control unit 80 which is connected through electric cables 84, 84' to a motor driven rheostat 85. The latter is included in the shunt field winding circuit of motor 45 which is a compound direct current motor. Variation of the resistance in the shunt field winding circuit varies the speed of motor 45 in a corrective direction. While the operation of this automatic control is described more fully in connection with Fig. 7, it should be understood that the illustrated control operated by differential output shaft 79 is exemplary only, and other arrangements for controlling the speed of motor 45, responsive to movement of shaft 79, may be used. Also, an electrical or electronic differential detection arrangement may be substituted for the mechanical differential unit 75.

The semi-automatic tilting control of Figs. 2 and 3 operates in the following manner. The cam 55 is driven at a uniform angular velocity by synchronous motor 21 through speed changer 116 and the cam is secured to the output shaft of reducer 74 by means of a set screw 87. To begin operations, set screw 87 is loosened and motor 21 is energized during the preliminary non-pouring tilting of ladle 10. Motor 45 is energized to tilt ladle 10, driving indicator 60 through transmission 23, 24. Cam 55 is meanwhile manually rotated to rotate indicator 65, through cable 52, etc., to maintain the indicators coincident. As the actual pour starts, set screw 87 is tightened so that cam 55 is rotated by motor 21. Through rheostat 78, the operator adjusts the speed of motor 45 to maintain indicators 60, 65 in correspondence. This maintains the tilting rate at the preselected optimum value, determined by the setting of pins 39 in cam 55.

The actual speed of pour, or the rotation rate of cam 55, may be selected as desired by proper setting of a speed changer 116 connected between motor 21 and speed reducer 74. Speed changer 116 is preferably a stepless device capable of varying the angular velocity of cam 55 over a wide range, although a suitable step-by-step speed selector or shifter may be used.

The operation of the fully automatic control will be best understood by reference to Figs. 1, 5, 6 and 7. In this embodiment, cam 55 is loosely mounted on the output shaft of reducer 74 and arranged to be coupled thereto by a magnetic clutch 88 energized by a coil 89 (Fig. 7). A pin 95 (Fig. 5) is arranged to lock output shaft 79 of differential 75 against movement when a coil or solenoid 91 is energized (Fig. 7). Coils 89 and 91 are electrically interlocked so that, when one is energized, the other is deenergized, and vice versa. Thus, when clutch 88 is engaged, the locking pin is disengaged, and vice versa. As may be seen in Fig. 6, output shaft 79 carries a first arm 92 rigidly secured thereto and a second arm 93 frictionally coupled thereto by a friction clutch or the like 94. These two arms control the operation of the circuit components in control unit 80.

The automatic control arrangement need be indexed only at the time of installation. With ladle 10 in the vertical position, for example, cam 55 is so indexed that chain 52 will begin to wrap around pins 39 at the instant ladle 10 is tilted to the pouring commencement position.

In Fig. 7, motor 45 is illustrated as a compound motor having an armature 103, a series field winding 104 and a shunt field winding 106. Speed control is effected by varying the strength of shunt field winding 106. For this purpose, a rheostat 85 and two fixed resistors 117, 118 are connected in series with winding 106. Rheostat 85 is driven by a condenser type reversible A. C. motor 105 having a pair of windings 108, 108' across which is connected a condenser 107. A hand wheel 111 is provided for the rheostat, and motor 105 is connected to the rheostat through a magnetically operable clutch 109 which is disengaged whenever a coil 119 is energized. Resistors 117, 118 are each of a value sufficient to effect a 10% step variation in speed of motor 45. A normally closed contact B-2 of a relay B shunts resistor 117, and a normally open contact A-2 of a relay A shunts resistor 118.

In starting the pour from ladle 10, it is frequently necessary to tilt the ladle through some distance before metal begins to pour from the ladle. During this preliminary, non-pouring tilting, it is desirable to tilt the furnace at speeds in excess of that preselected for an optimum pour rate. To effect this, shunt or jump switch 96 and "raise" switch 97 are closed. Switch 96 closes the energizing circuit for coil winding 98, and switch 97 closes the pick up circuit of "raise" relay R, which completes a holding circuit through contacts R-1. Energization of coil 98 moves armature 100 out of engagement with contact 101 and into engagement with contact 102. This breaks the circuit of energizing coil 89 of magnetic clutch 88, closes the circuit of coil 91 to move pin 95 to lock output shaft 79 of differential 75, and closes the circuit of coil 119 to disengage rheostat clutch 109. The synchronous cam motor 21 and the self-synchronous arrangement 23, 24 have been previously energized from an A. C. source by closure of switch 99. However, motor 21 does not rotate cam 55 as clutch 88 is deenergized.

When relay R picks up, it closes its contacts R-1, R-2 and R-3. R-1 closes a holding circuit in shunt with push button 97. R-2 and R-3 complete a circuit for energizing motor 45 to drive hoist 22 in the raising direction. Clutch 109 is disengaged due to energization of coil 119, so that rheostat 85 may be hand operated by wheel 111.

During such preliminary tilting, rheostat 85 is adjusted by hand wheel 111 to increase the speed of motor 45 to rapidly tilt ladle 10 to the position where it is ready to pour molten metal into tun dish 25. During this operation of motor 45 under manual speed control, pin 95 locks differential output shaft 79 against movement. Consequently, input shaft 33, driven by the self-synchronous arrangement 23, 24 in correspondence with the movement of hoist 22, effects a direct drive of input shaft 37. The latter, in turn, drives sprocket 71, through sprocket 73 and chain 72, to rotate sprocket 54 in a counter-clockwise direction. This allows chain 52 to move toward cam 55, where it wraps around the cam pins 39 as the cam is also rotated counterclockwise by weight 129 attached to cable 131 secured at its end to the cam and wrapped around its periphery. When ladle 10 is at the pouring position, "stop" push button 110 is operated to break the holding circuit for relay R, and switch 96 is released.

It should be noted at this point that, whenever the D. C. circuit is energized through closure of switch 112, a normally closed switch 115 completes an energizing circuit for coil 98 to move armature 100 to engage contact 102 and energize pin solenoid coil 91 while breaking the circuit for clutch energizing coil 89. Consequently, output shaft 79 is locked when the D. C. circuit is closed. However, when "raise" push button 97 is operated to pick up relay R, a circuit is completed through a coil 113 which moves switch 115 to the open position. Unless "jump" switch 96 is closed manually, clutch 88 will connect cam 55 to reducer 74, and output shaft 79 will be free to move in response to any differential motion of the two input shafts 33, 37. Should any interruption of the tilting procedure occur, the opening of the energizing or holding circuit of relay R deenergizes coil 113 and switch 115 closes. This energizes coil 98 to move armature 100 to break the magnetic clutch energizing circuit and close the circuit for pin solenoid coil 91. Thus, upon the happening of such interruption, cam 55 is disconnected from its motor drive and shaft 79 "frozen" so that the cam and the hoist are locked in synchronism.

To start automatic control of the pour, push button 97 is operated to pick up relay R and also energize coil 113. Relay R connects motor 45 for operation in the hoist or raise direction. Coil 113 opens switch 115 to deenergize coil 98, so that spring 114 snaps armature 100 to engage contact 101. Coil 89 is energized to engage clutch 88 to connect cam 55 to its synchronous motor drive. Coils 91 and 119 are deenergized, with drawing pin 95 to unlock shaft 79 and engaging clutch 109 to connect motor 105 to rheostat 85.

The desired rate of pour is selected by adjustment of speed changer 116 connected between synchronous motor 21 and speed reducer 74. This adjustment having been made, motor 21 drives cam 55 at a constant angular velocity in a counter-clockwise direction (as viewed in Fig. 1) to wrap chain 52 around pins 39. The angular velocity of input sprocket 54 is thus varied in accordance with the optimum rate of variation of the tilting ladle 10.

The motion due to cam 55 is transmitted to differential input shaft 33, whereas that due to hoist 22 is transmitted to differential input shaft 37. Any differential in the relative velocities of these two input shafts effects a corresponding movement of the differential output shaft 79 having the arm 92 rigidly fixed thereto and the arm 93 frictionally connected thereto. Arm 93 controls the direction of operation of motor 105, and arm 92 controls the selective connection of resistors 117, 118 into the circuit of shunt field winding 106.

The operation of arms 92, 93 in controlling the speed of motor 45 will be understood best from Fig. 7. Arm 92, dependent upon its direction of movement from the neutral position shown in Fig. 7, is arranged to sequentially operate either a switch 121 and a switch 122, or a switch 121' and a switch 122'. Swith 121 is a normally closed switch controlling a holding circuit for relay B, and switch 122 is a normally open switch in the pick up circuit of relay A. Similarly, switch 121' is a normally closed switch controlling a holding circuit for relay A and switch 122' is a normally open switch in the pick up circuit of relay B.

Arm 93, dependent upon its direction of movement from the illustrated neutral position, is arranged to close either of a pair of normally open switches 123, 123' connected, respectively in the circuits of the "speed decrease" winding 108 and the "speed increase" winding 108' of motor 105. When winding 108 is connected to the line, motor 105 operates rheostat 85 to decrease the amount of resistance included in series with shunt field winding 106, thus strengthening this field winding and reducing the speed of motor 45. The reverse occurs when winding 108' is connected to the line.

Assume that hoist motor 45 is operating hoist 22 at a rate in excess of the desired optimum tilting rate and that neither relay A nor relay B is energized so that resistors 117 and 118 are in normal position and motor 105 is free to be operated in either direction. In such case, indicator 60 will turn faster than indicator 65, shaft 33 turning faster than shaft 37. This condition requires a decrease in the speed of motor 45, so that differential output shaft 79 turns in the counterclockwise or "speed decrease" direction. Arm 93 closes switch 123 to connect "speed decrease" winding 108 of motor 105 directly to the line. Switch 123 blocks further movement, and motor 105 drives rheostat 85 to decrease the resistance in circuit with shunt field winding 106. Motor 45 slows down, so that indicator 60 is slowed down.

If the speed decrease is not enough to bring indicators 60, 65 to the same speed, output shaft 79 continues to turn counterclockwise. Arm 93 slips, through friction clutch 94, and arm 92 opens switch 121 and then closes switch 122. Opening switch 121 has no effect on the circuit since relay B is not energized, but closing switch 122 energizes relay A which locks in through switch 121' and contact A-1. Contact A-2 closes shunting out resistor 118 which is 10% of the total field resistance causing a large drop in speed of hoist motor 45. Contact A-3 opens, locking out switch 123' in the "speed increase" winding so that, during the period of subnormal speed resulting from contact A-2 being closed, arm 93 cannot cause motor 105 to drive rheostat 85 even farther in error in the "high speed" direction.

As indicator 65 begins to overhaul indicator 60, the speed differential causes shaft 79 to turn clockwise. Arm 93 releases switch 123 and closes switch 123'. This had no effect because of contact A-3 being open. As shaft 79 continues to turn clockwise it carries arm 92 to switch 121' dropping out relay A and returning the circuit to normal. If the hoist motor again travels too fast, shaft 79 will again turn counterclockwise and again motor 105 will turn in the "speed decrease" direction. Thus, motor 105 in conjunction with rheostat 85 adjusts the speed under normal operating conditions, and relays A and B institute abnormal operating conditions temporarily to bring the error between indicator 65 and indicator 60 back to within allowable limits. Such control action takes place throughout the pour.

When the pour is completed, "raise" relay R is dropped by pressing either "stop" push button 110 or "lower" push button 120. The latter picks up "lower" relay L, which closes its holding circuit through contact L-1, and closes contacts L-2, L-3 to effect reverse energization of motor 45. Coil 113 has been deenergized, so that switch 115 is closed to energize coil 98 swinging armature 100 to break the circuit of magnetic clutch 88 and close the locking pin circuit and the disengagement circuit of clutch 109. Cam 55 is thus driven in the reverse, or chain 52 unwinding, direction by receiver 24, weight 59 acting on cam 55 to hold chain 52 taut as it is pulled toward sprocket 54.

As stated above, the present invention primarily is directed to a method of and apparatus for controlling the rate of pouring fluid material from one container to another. In certain operations to which the invention is applicable, for example, the continuous casting operation just described, not only is it desired to control the pouring rate but it is also desired to maintain the level of material within the second container at an optimum value. With the pouring rate controlled by a master tilting rate control, this level may be maintained with a fair degree of accuracy at the optimum value by selecting a suitably corresponding rate of withdrawing or discharging material from the second container. In the above continuous casting operation, extreme accuracy of metal level control is necessary, and this accuracy may be affected by certain factors, such as erosion or changes in the geometry of the ladle 10. To detect any deviations of the level from the optimum value, and to correct for such deviations, the invention further contemplates the use of a material level control which continually measures the material level and correctively varies the material withdrawal and discharge rate to maintain the level accuracy at the optimum value.

In other operations, where the material is not withdrawn from the container or where the geometry of the pouring container remain constant, the vernier level measuring control is not needed. For example, in centrifugal casting only the pouring rate need be controlled, and is generally varied from an initial maximum rate to a later reduced rate. As the casting is not withdrawn from the mold until it has completely solidified there is no necessity for measuring the level of the molten metal.

One satisfactory form of fine or vernier level control is the radiation beam control shown and described in application Serial No. 73,643, and shown at 40 in Fig. 1 and in some detail in Figs. 8 and 9. Control 40 includes a housing 41 enclosing a source of penetrative radiation, such as an X-ray tube. A guide tube 42 connects housing 41 to an annular chamber 43 surrounding the outer tube 32 of mold assembly 30. A housing 44 encloses an ionization chamber 50 which is electrically connected to control box 34 supplied with electric power from source 36. Control box 34 contains suitable electrical or electronic components operable, responsive to the degree of ionization in chamber 50, to control the speed of motor 20. This controls the speed of pinch rolls 16 to control the rate of withdrawal of casting 35 from mold assembly 30, and thus control the level of molten metal in the mold assembly.

Housing 41 comprises a steel casing 46 having a relatively thick inner lead lining 47 continuous with the inner lead lining 48 of the steel casing 49 of guide tube 42. The outer end of tube 42 enters chamber 43 and is closed by a circular lead plate 51 continuous with the lead lining.

Chamber 43 is formed as a cylinder having top and bottom walls, apertured to fit over mold tube 32, and a side wall. The latter is apertured to receive guide tube 42 and, opposite such aperture, opens into housing 44. The latter comprises a substantially rectangular steel casing having side walls, a bottom wall, a top wall and an end wall 56. The end wall has an opening 57 just beneath the top wall, and the latter is extended, as at 58, beyond end wall 56. Housing 44 is connected to chamber 43 by a rectangular duct 61, and the housing and duct have a continuous, relatively thick inner lead lining 62 continuous with the inner lead lining 63 of chamber 43.

An X-ray generator or tube is mounted in housing 41, with its cathode being indicated at 64. The X-ray tube is controlled from panel 66, having conductors 67 extending into housing 41, and provided with meters 68. From plate 64, a stream of electrons is directed against target plate 64' which directs a beam of X-rays into guide tube 42.

End plate 51 of tube 42 has an upwardly elongated aperture 76 to direct an upwardly elongated beam 81 of X-rays through mold tubes 31, 32 and into ionization chamber 50 at the intersection of chamber 43 and duct 61. Ionization chamber 50 has an upwardly elongated aperture 83 diametrically aligned with aperture 76, and having a height of the same order, to receive beam 81 or any portion thereof, passing through mold assembly 30. The X-rays entering chamber 50 control the conductivity thereof, as is well known to those skilled in the art.

A potential is impressed on chamber 50 from control 34 through the medium of transmitter 82, and the current flow due to such potential is a function of the degree of ionization in chamber 50. The degree of ionization is, in turn, a function of the intensity of radiation entering aperture 83, and the intensity of radiation is a function of the molten metal level in mold liner 31. As this level rises or falls, it cuts off more or less of the extent of beam 81. Consequently, the effective radiation intensity of the beam 81 entering chamber 50 varies from normal inversely in accordance with the amount of the beam intercepted by the molten metal 86.

The voltage drop across chamber 50 is used with a suitable electric and/or mechanical control arrangement, having anti-hunt characteristics, to govern the speed of motor 20. The latter is adjusted to operate at a pre-selected speed, corresponding to the preselected pour rate, when the ionization of chamber 50 is at the null point, that is, when the molten metal level is at the desired optimum value. An increase in voltage, due to a drop in the molten metal level, effects a reduction of the speed of motor 20 to reduce the withdrawal rate of casting 35. Similarly, when the voltage decreases due to a rising level, the speed of motor 20 is increased to increase the casting withdrawal rate. Such level variations, as stated, are caused by variations in the pour rate due to erosion, slag accumulation, etc. The unit 40 thus acts as a fine adjustment co-operating with the tilting control to maintain the level at an optimum value.

Figs. 10, 11 and 12 somewhat schematically indicate an arrangement for recording the exact time when cable 52 contacts each pin 39 of cam 55. By comparing this record with the actual tilt of the ladle at corresponding time increments, it is possible to set pins 39 to very accurately produce the desired tilting rate.

In the subject arrangement, cam 55 is made of a suitable dielectric material such as wood, hard rubber, synthetic resin or the like, whereas pins 39 are of a suitable electrically conductive material such as copper, brass, etc., and project uniformly beyond the forward face of cam 55. A disk 137 of insulating material is mounted on the cam shaft adjacent the cam and has an outer rim or ring 138 of conductive material such as brass, or the like, engaged by a fixed collector brush 124. Pins 39 are electrically interconnected by resistors 135, and a conductor 139 connects ring 138 to the pin 39 furthest from anchor pin 53 (in a clockwise direction as viewed in Fig. 10).

A conductor 126 connects brush 124 to one terminal of a suitable source of electric potential, schematically indicated as a battery 127. The other terminal of battery 127 is connected, by a conductor 128, to a recorder 125 of the type having a chart or pen movable in accordance with time and in exact synchronism with the container being tilted. Cable 52 is likewise of conductive metal so that, as the cable engages pins 39, the cable is in circuit connection with battery 127 and recorder 125.

Input pulley 54' of unit 70 includes a center of dielectric material and a rim 132 of electrically conductive material, such as copper, brass or the like. A brush 134 is mounted on a post 133 on the rear of panel 77 and wipes over rim 132. A conductor 136 connects post 133 to recorder 125.

With the described arrangement, whenever cable 52 engages an additional pin 39, as cam 55 is rotated counterclockwise, the resistance of the recorder circuit is step decreased by the ohmic value of one of the resistors 139 shunted by cable 52. Consequently, with each such engagement of the cable with a pin, there is a sharp, step increase in the circuit voltage. The pen, or other chart marking implement, will thus draw a stepped line on the recorder chart. If the latter is moved in accordance with the amount of container tilting, a graph is provided showing the relation between the cam surface or pin setting and the actual container tilt.

While the invention method and apparatus, including the vernier level control, have been shown as applied to a continuous metal casting operation, such has been done only to provide an illustrative example of the application of the invention principles, and the invention is applicable to control pouring in any desired operation. Additionally, with the vernier level control supplementing the master tilt control, the fluid material level in the receiving container may be kept accurately at a predetermined optimum value. Such typical other operations include centrifugal casting of metal or other molten material, the batch charging of chemical reaction chambers, and similar operations.

For example, the invention controls may be applied to the type of continuous metal casting operation described and claimed in the co-pending application of I. Harter, Jr., Ser. No. 103,901, filed July 9, 1949, for "Continuous Casting Process and Apparatus." In such operation, the molten metal is poured at a continuous uniform rate into the mold but the rate of withdrawing the casting is cyclically varied.

As applied to this continuous casting operation, the master or tilt control is used to maintain the pour rate substantially uniform. The vernier level control is used to determine the rise of metal in the mold to a predetermined value. When the metal level reaches such value, the vernier control triggers a timer controlling the operation of the casting withdrawal mechanism. Thus, the metal level in the mold cyclically rises and falls under the control of the master ladle tilt control, the vernier level control and such timer. Adjustment of one or more of these factors determines the length of time the metal is in contact with the chilled walls of the mold.

While specific embodiments of the invention have been shown and described to illustrate the application of the principle thereof, it will be understood that the invention may be embodied otherwise without departing from such principles.

We claim:

1. Apparatus for controlling the position of a movable member comprising, in combination, mechanism operable to adjust the position of the member; a variable speed electric motor for operating said mechanism; a differential comparison device having a rotatable output element and a pair of inputs; means operatively interconnecting said mechanism and one input constructed and arranged to impress on such one input a value corresponding to the motor speed; means operatively connected to the other input and constructed and arranged to impress thereon a value corresponding to a desired motor speed; said output member rotating at a speed and in a direction dependent upon the difference of such values; a first clutch component rigidly secured to rotate with said output element; a second clutch component frictionally driven by said first component to rotate with said output elements; a motor speed controller associated with the motor and including means operable by said second component, immediately upon rotation of said output element in either direction due to a difference of such values, to initiate a corrective variation in the motor speed, and means operable by said first component, upon a substantial continued rotation of said output element in either direction, to effect a major corrective change in the motor speed; said last named means, when operated, deactivating the means actuated by said second component; said second component slipping relative to said first component, during such continued rotation, to remain in position to immediately effect a reverse corrective variation in the motor speed if the direction of rotation of said output element is reversed.

2. In apparatus for transferring molten metal from a tiltable initial container into a receiving container, means for controlling the pouring rate comprising, in combination, mechanism operable to tilt the initial container to pour molten metal therefrom into the receiving container; a movement comparison device including a pair of operatively associated movable input elements conjointly operable upon a movable output element, said input and output elements being so constructed and arranged that the output element is moved only upon movement of said input elements relative to each other; means connecting one of said input elements to said mechanism for movement thereby in accordance with tilting of the initial container; a driving member; means for moving said driving member at a substantially constant rate; a driven member; driving means interconnecting said members and constructed and arranged to translate the substantially constant speed of said driving member into a speed of said driven member corresponding to an initial container tilting rate determined by an optimum pour rate; means connecting the other input element to said driven member for movement thereby in accordance with such predetermined tilting rate; said input elements thereby moving in synchronism when said tilting rates are equal; speed control means for said mechanism; and means interconnecting said control means and said output element for adjustment of said control means, by movement of said output element responsive to relative movement of said input elements, to vary the speed of said mechanism in a direction to synchronize the movements of said input elements.

3. In apparatus for transferring molten metal from a tiltable initial container into a receiving container, means for controlling the pouring rate comprising, in combination, mechanism operable to tilt the initial container to pour molten metal therefrom into the receiving container; a movement comparison device including a pair of operatively associated movable input elements conjointly operable upon a movable output element, said input and output elements being so constructed and arranged that the output element is moved only upon movement of said input elements relative to each other; means connecting one of said input elements to said mechanism for movement thereby in accordance with tilting of the initial container; a cam member having a cam surface selectively variable to set up a predetermined tilting rate corresponding to an optimum pour rate; means for moving said cam member at a substantially constant rate; a driven member; cam follower driving means interconnecting said members to drive said driven member at a speed corresponding to such predetermined tilting rate; means connecting the other input element to said driven member for movement thereby in accordance with such predetermined tilting rate; said input elements thereby moving in synchronism when said tilting rates are equal; speed control means for said mechanism; and means interconnecting said control means and said output element for adjustment of said control means, by movement of said output element responsive to relative movement of said input elements, vary to the speed of said mechanism in a direction to synchronize the movements of said input elements.

4. Pour rate control means as defined in claim 3 wherein said cam member is rotatable and of dielectric material, such variable contour is provided by electrically conductive pins selectively positioned in said cam member, said driving means comprises an electrically conductive cable trainable over said pins and said driven member is rotatable and has an electrically conductive surface engageable by said cable, and including a recording device and a normally open energizing circuit therefor including a source of electric potential, a plurality of impedances interconnecting said pins and connected in series with such source and said recording device, and brush means engaging said conductive surface and in series with such source and said recording device; said cable completing such energizing circuit, whereby the circuit impedance is varied, each time the cable engages a pin, to impulse said recording device.

5. In apparatus for transferring molten metal from a tiltable container into a mold and withdrawing the casting from such mold as the metal is at least partially solidified, mechanism operable to tilt the container; a device providing a measure of the actual pour rate from the tilting container; a device providing a measure of an optimum pour rate from the tilting container; deviation determining means conjointly controlled by both of said measuring devices to operate only upon a deviation of the measured actual pour rate from the measured optimum pour rate; speed control means for said mechanism; and means operatively connecting said determining means to said speed control means and constructed and arranged to operate the latter, upon occurrence of any such deviation, to vary the speed of said mechanism in a direction to restore correspondence between the measured actual pour rate and the measured optimum pour rate.

6. In apparatus for transferring molten metal from a tiltable container into a mold and withdrawing the casting from such mold as the metal is at least partially solidified, electric motor driven mechanism operable to tilt the container; a device providing a measure of the actual pour rate from the tilting container; a device providing a measure of an optimum pour rate from the tilting container; deviation determining means conjointly controlled by both of said measuring devices to operate only upon a deviation of the measured actual pour rate from the measured optimum pour rate; rheostat means controlling the motor speed; and means operatively connecting said determining means to said rheostat means and constructed and arranged to operate the latter, upon occurrence of any such deviation, to vary the speed of said mechanism in a direction to restore correspondence between the measured actual pour rate and the measured optimum pour rate.

TEMPLE W. RATCLIFFE.
SIDLEY O. EVANS.

REFERENCES CITED

The following references are of record in the file of this patent:

UNITED STATES PATENTS

| Number | Name | Date |
| --- | --- | --- |
| 2,246,907 | Webster | June 24, 1941 |
| 2,290,083 | Webster | July 14, 1942 |

FOREIGN PATENTS

| Number | Country | Date |
| --- | --- | --- |
| 339,095 | Great Britain | Dec. 4, 1930 |